Figure 1:
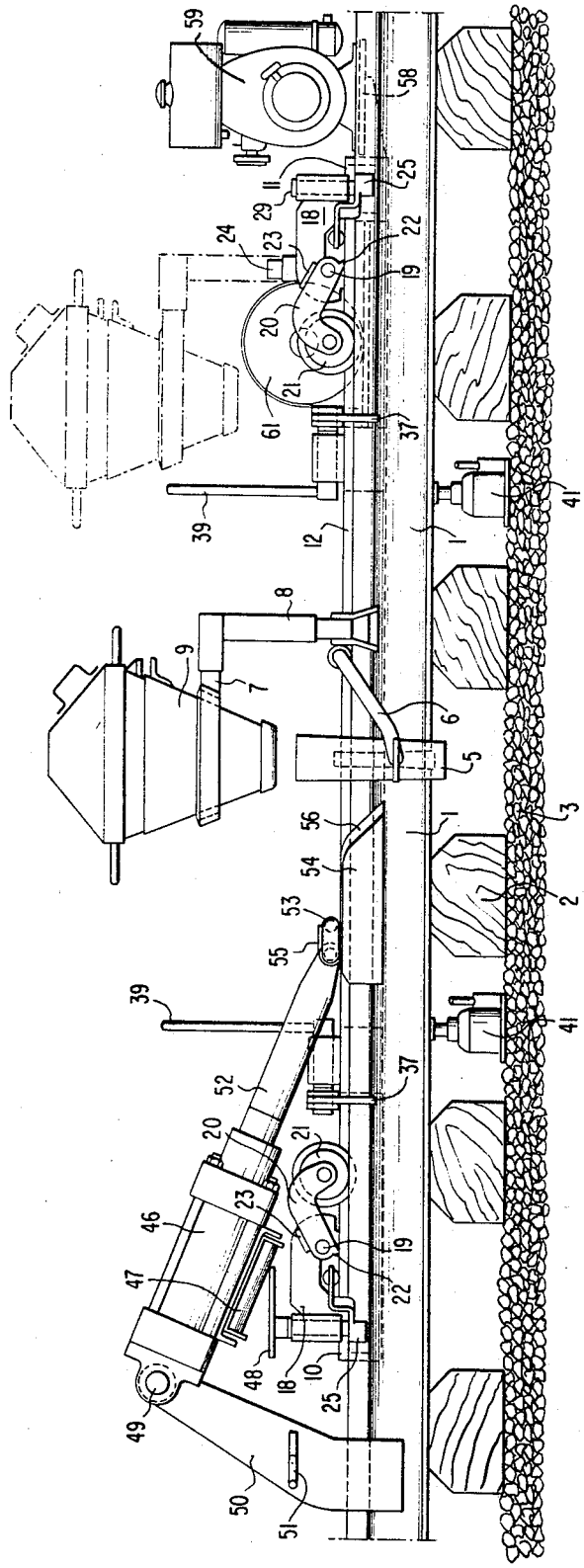

Nov. 12, 1968 W. AHLERT 3,409,962
APPARATUS FOR MAKING RAIL WELDS
Filed Dec. 27, 1966 3 Sheets-Sheet 1

INVENTOR
WILHELM AHLERT

*James E. Bryan*
ATTORNEY

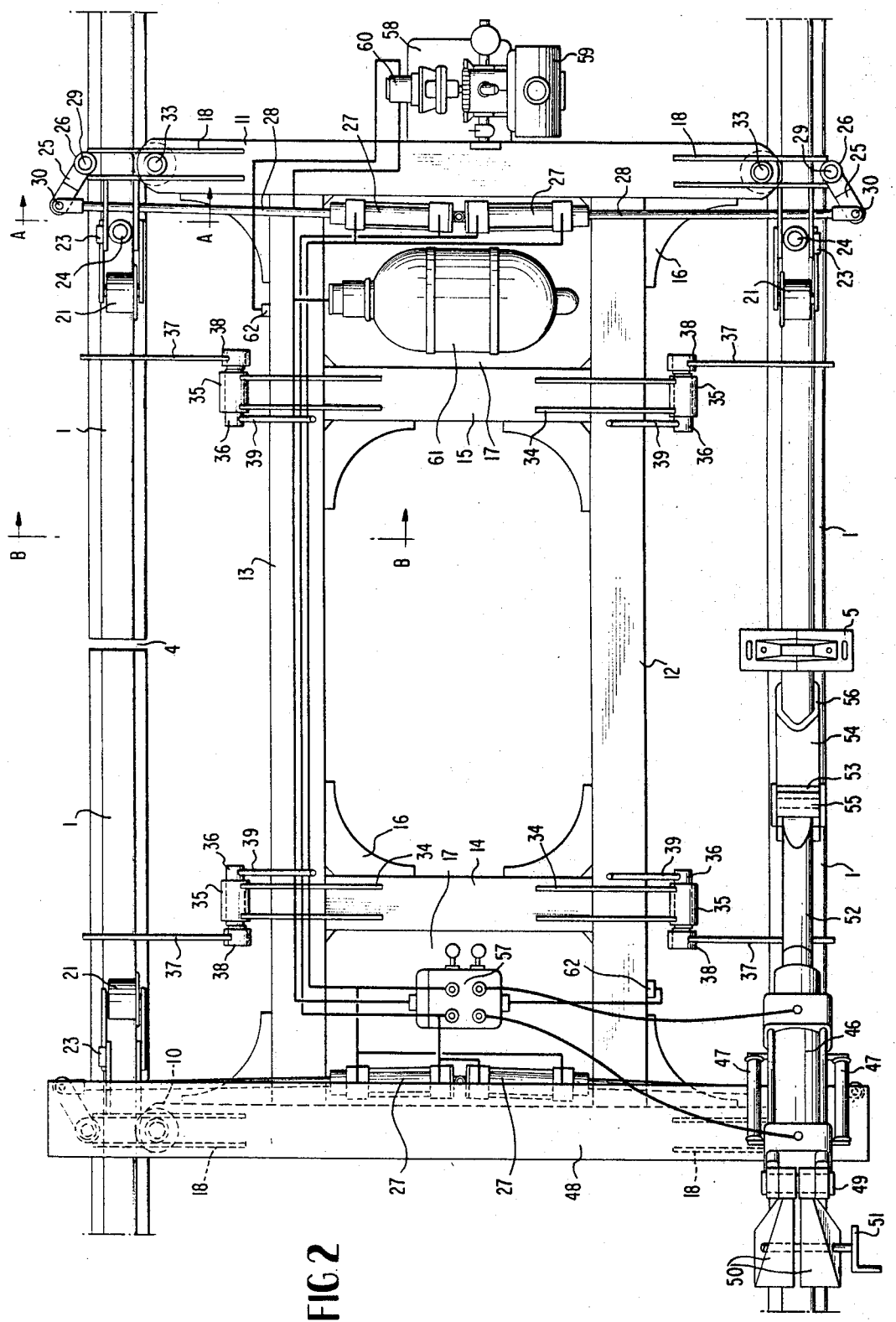

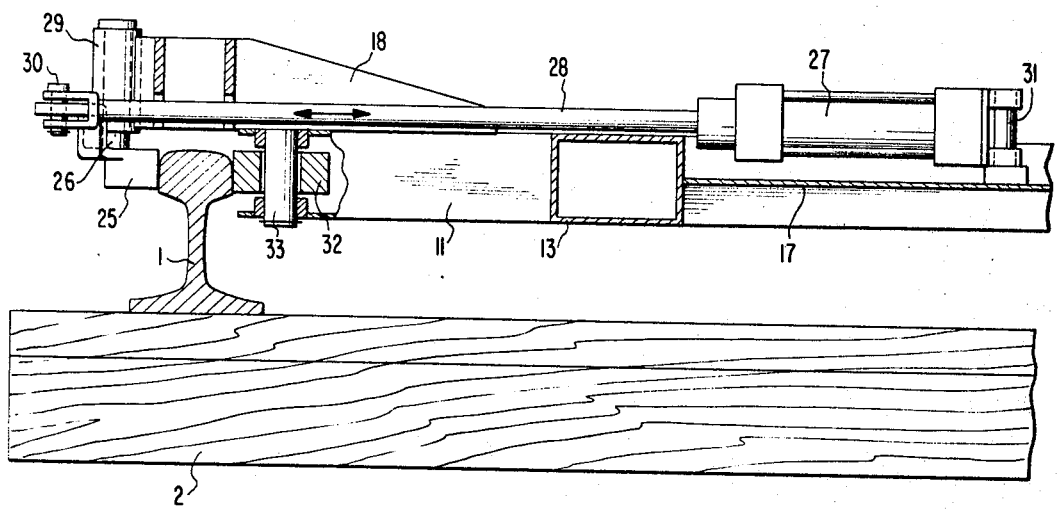
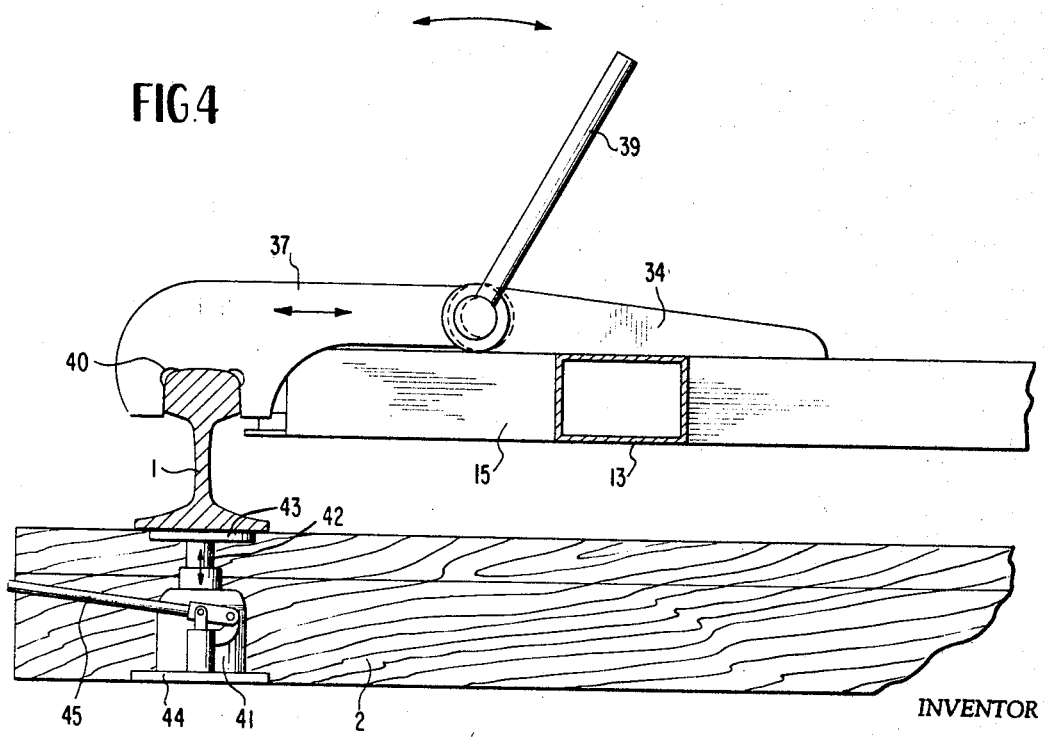

3,409,962
APPARATUS FOR MAKING RAIL WELDS
Wilhelm Ahlert, Essen-Bredeney, Germany, assignor to Elektro-Thermit G.m.b.H., Essen, Germany, a limited-liability corporation of Germany
Filed Dec. 27, 1966, Ser. No. 604,894
Claims priority, application Germany, Jan. 5, 1966, E 30,785
7 Claims. (Cl. 29—33)

The present invention relates to an apparatus for making rail welds, particularly using the aluminothermic welding process. The apparatus facilitates the necessary operations for making welds, reduces the time required, and eliminates sources of errors. The apparatus comprises a frame equipped with rollers and which may be clamped to rails to be welded. The frame permits free access on all sides to the rail sections positioned between the rollers, in the longitudinal rail direction, and means are provided on the frame for aligning the rail ends. The frame also has means thereon for supporting the reaction crucible required for performing an aluminothermic welding process and the frame also carries a shearing device for removing excess weld metal from a welded joint.

In the known methods for welding rails, particularly when making welds in tracks which are already laid, the preparation of perfect joints requires, in addition to expert execution of the welding process, an equally careful execution of the necessary operations prior to and after the actual weld is made, which operations are dependent upon the requirements to be met by the joint while in service.

The operability and operational efficiency of the rail welding process employed, as well as the time required for making a flawless joint, depends not only upon the welding process proper but also upon the extent and manner of execution of the required preliminary and subsequent work.

In the aluminothermic welding of rails in which the ends of the rails to be welded are laid with a gap and are enclosed within a casting mold, the rail ends are melted down either without or following an extraneous preheating of the rail ends, by means of preheating burners operating on fuel-air or fuel-oxygen mixtures, and are welded by pouring aluminothermically produced steel into the casting mold. The preliminary and subsequent operations include the alignment of the rail ends to be welded, prior to welding, and in removing after welding, in a manner true to profile, the weld metal excess resulting from the welding process.

While it was heretofore possible in aluminothermic rail welding to facilitate considerably and thereby reduce the amount of time and effort required for making a weld, for example by utilizing prefabricated casting molds and preheating the rail ends from above, the preliminary and subsequent work required are still very time consuming and involve great physical effort on the part of the workman so that the advantages to be achieved by means of the welding process are obtained only incompletely. Thus, heretofore, as in all rail welding processes, the alignment of the rail ends was effected manually. In the heretofore known processes, the rail ends are warmed and wedges are driven between the rail foot and the crosstie. The removal of the excess weld metal, which projects after welding beyond the rail profile, also is effected manually while the excess metal is in the red-hot condition. The metal is removed either by means of a hammer and chisel, or by means of compressed air- or electrically-operated chipping hammers. The known method of aligning the rail ends and the removal of the excess weld metal, which is performed manually, requires the greatest care since a directional error caused by inaccurate alignment of the rail ends can be corrected after welding only with great difficulty. Further, faulty manipulation of the chisel easily may result in damage to the rail.

The apparatus of the present invention for performing rail welds comprises a frame including cross bearer members bridging the track and being composed, preferably, of hollow sections. One or more longitudinal bearer members connect the cross bearer members, the longitudinal bearer members being positioned between and preferably parallel to the rails forming the track and at a distance therefrom. Roller carriers with stationary or vertically pivotal rollers are secured to the ends of the cross bearer members and aligning arms also are secured to the longitudinal bearer members, the aligning arms being adjustable transversely to the track either manually or mechanically and being pivotal in perpendicular planes transversely to the track. The aligning arms have recesses therein corresponding to the cross section of the rail head. Lifting means are employed in conjunction with the frame and are positioned below the rail feet, the lifting means being operated either manually or mechanically. The frame also carries a hydraulic working cylinder which is mounted for transverse movement relative to the track and is mounted above a cross bearer member. The working cylinder is adapted to be clamped to a rail and is connected to a cutting tool which encloses the rail head, the hydraulic working cylinder also being connected to a drive aggregate which is mounted on the frame.

The apparatus also includes clamping means engaging the outer sides of the rails and being adapted to be operated either manually or hydraulically, as well as supports for the reaction crucibles and, at the ends of the cross bearer members on the inside of the track, guiding and supporting rollers which rest against the sides of the rail heads, which axles being positioned at a right angle to the axles of the aforementioned vertically pivotal rollers.

The hydraulic working cylinder, which may be clamped to the rails, is hingedly connected at one end thereof to two clamping jaws, which jaws have recesses at the lower ends thereof corresponding to the profile of the rail head. Both clamping jaws enclosing the rail head may be clamped by manually actuated bolted connections.

Further, the device for removing the excess weld metal, using the hydraulic working cylinder with cutting tool attached, includes an oil-hydraulic driving means which is mounted on the frame and is connected with the working cylinder by way of control, regulating, and conduit elements, and which includes a reservoir for pressure fluid, a pump, a drive motor, and an oil reservoir. The frame, which is either completely or partially formed of hollow bearer members, is utilized as an oil reservoir for the withdrawal of pressure oil required for charging the pressure reservoir as well as for receiving oil flowing back from the working cylinder.

The invention will be further illustrated by reference to the accompanying drawings in which:

FIGURE 1 is a view in elevation of one embodiment of the welding apparatus of the present invention, FIGURE 2 is a top view of the device of FIGURE 1 shown with the casting mold 5 enclosing a rail joint to be welded, FIGURE 3 is a view in cross section taken on line A—A of FIGURE 2, and FIGURE 4 is a view in cross section taken on line B—B of FIGURE 2.

Referring to the drawings, the rails 1 to be welded are supported by the crossties 2 which are laid on the ballast bed 3. FIGURES 1 and 2 show, in addition to the novel apparatus of the present invention, the known means required for performing aluminothermic rail welds such as, for example, the casting mold 5 enclosing the ends of the rails 1, which rails are laid with a gap 4, a clamping device 6 required for forcing the casting mold against the rail ends, which clamping device is secured to the rail 1, and also the crucible holder 7 having the tubular portion 8 and the reaction crucible 9. The representation in phantom in FIGURE 1 of the crucible 9 and the crucible holder 7 shows these elements in the position of rest thereof. The crossties 2, the ballast bed 3, the clamping device 6, the crucible holder 7, and the reaction crucible 9 are not shown in FIGURE 2 in the interest of clarity.

The apparatus includes a frame which preferably is constituted of hollow profile carriers and consists of cross bearer members 10 and 11 bridging the track, longitudinal bearer members 12 and 13 connecting the cross bearer members, and bearer members 14 and 15 extending parallel to the cross bearer members and connecting the longitudinal bearer members, the supporting structure or framework thus formed being reinforced by gussets or corner plates 16 and web plates 17. Secured to the ends of the cross bearer members 10 and 11 are roller carriers 18 and connected therewith are rollers 21 which are mounted to pivot about the axles 19 by means of the supporting angle levers 20. The rollers 21 are provided with flanges and the angle levers 20, with either the narrow upper sides thereof or the notches 22, are supported against abutments 23 which are secured to the roller carriers 18. Also mounted at the roller carriers 18 are connecting or socket members 24 for receiving the tubular portion of the crucible holder 7 as well as hydraulically operated clamping devices which act on the outer rail side and clamp the frame to the rails 1.

As shown in FIGURES 1 to 3, the clamping devices consist of angularly bent clamping or bolt levers 25 connecting the axles 26 with the hydraulic working cylinders 27 having connecting rods 28. The axles 26 of the clamping levers 25 are mounted in bearings 29 secured to the roller carriers 18 whereas the ends on one side of the clamping levers 25 are connected by way of the joints 30 with the connecting rods 28 of the working cylinders 27. The working cylinders 27 are hingedly connected with axles 31 secured to the web plates 17 of the underframe. Also provided for purposes of the lateral guide and support of the underframe are guiding and supporting rollers 32 at the ends of the cross bearer members 10 and 11 on the inner track side, which rollers rest against the sides of the rail heads and are rotatable about the axles 33 secured to the cross bearer members 10 and 11 and positioned at a right angle to the axles of the rollers 21.

For purposes of lateral alignment of the rail ends to be welded, aligning means are mounted on the undercarriage or frame at the bearer members, which aligning means consist of brackets 34 rigidly secured to the bearer members and including bearings 35, eccentric shafts 36, and aligning arms 37 which are provided at the ends thereof with the bearings 38 and, at the other ends thereof, with recesses corresponding to the cross section of the rail head. The straight shaft portions of the eccentric shafts 36 are supported in the bearings 35 whereas the eccentrics are enclosed by the bearings 38 of the aligning arms 37. For the purpose of moving the eccentrics and the aligning arms 37, the shaft ends are provided with bores into which the displacing levers 39 may be inserted. For vertical alignment, locally movable manually-actuated hydraulic jacks 41 are positioned below the rail ends, which latter are supported by the plunger 42 and plates 43 against the underside of the rail feet, the base plates 44 being seated against the ballast bed 3. The lifting movement is effected by actuating the pumps of the lifting jacks with the aid of the hand levers 45.

In order to remove excess weld metal after completion of the welding operation, a hydraulic working cylinder 46, operated by pressure oil, is mounted on the frame as shown in FIGURES 1 and 2 and is adapted to be displaced transversely of the track by means of rollers 47 on a traverse 48, which latter is connected with the cross bearer member 10. One end of the working cylinder is connected, by means of a joint 49, with two clamping jaws 50 which have recesses at the lower ends thereof corresponding to the profile of the rail head. Both clamping jaws are adapted to be clamped to the rail head by means of a bolt with hand lever 51. The clamping jaws 50 are connected with the working cylinder 46 in a manner such that the longitudinal axes of the working cylinder 46 and the rail 1 enclose a variable angle. The piston rod 52 of the working cylinder 46 is connected at the end thereof to a rotatably mounted saddle bracket 53 which encloses a projection 55 connected with a cutting tool 54. The cutting tool 54 has a channel-like configuration corresponding to the profile of the rail head and includes a knife-edge 56 in the shape of a curve which is symmetrical with respect to the longitudinal central plane, with curve points being displaced in the direction of the longitudinal axis.

The working cylinder 46 is further connected to a drive aggregate by way of a control valve 57 and conventional safety devices, the driving aggregate being secured to the web plate 17, which latter is connected to the cross bearer member 11, and to the bracket 58. The drive aggregate includes a small gasoline or diesel engine 59, an oil pump 60, driven by the engine, and an oil pressure reservoir 61 which is equipped, for example, with a bag filled with nitrogen. The reservoir 61 is connected with the pump 60 and the working cylinders 27 and 46 by way of conventional conduits and safety devices. The portion of the frame constituted by the hollow profile bearer members 12, 13, 14, and 15, being equipped with inlet and outlet connections 62 for conduit elements, serves as an oil tank or reservoir for withdrawal of the pressure oil required for charging the pressure reservoir as well as for receiving the oil flowing back from the working cylinder.

For performing rail joint welds, particularly aluminothermic welds, the apparatus of the invention is positioned on the rails 1 of a track in a manner such that the rail joint to be welded, and the required gap 4, is positioned centrally between the cross bearer members 10 and 11 of the undercarriage. The construction of the undercarriage of the present invention, with the longitudinal bearer members 12 and 13 positioned between the rails and extending parallel thereto, ensures that the rail sections between the rollers 21 are accessible from all sides. The oil pressure reservoir 61 is charged with presure oil, which is pumped in by the oil pump 60 from the undercarriage which serves as an oil reservoir. When the desired oil pressure, which may be read from a pressure gauge not shown, has been attained, the engine 59 is switched off either manually or automatically. By actuating the control valves 57, the pistons of the working cylinders 27 are charged with high pressure oil at which time the connecting rods 28, connected to the pistons, force the clamping levers 25, which are rotatable about the axles 26, against the outer rail sides so that the undercarriage is securely clamped to the rails.

The lateral alignment of the rail ends to be welded then is effected and, in so doing, the aligning arms 37 are pivoted downwardly from the perpendicular position of rest thereof and are laterally displaced by rotation of the eccentric shafts 36, with the aid of the hand levers 39, until the recesses 40 of the arms 37 enclose the rail heads on both sides of the rail joint. Then, the aligning arms enclosing the rail ends to be welded, on one side, are displaced by rotation of the eccentric shafts 36 until the rail ends have the desired lateral direction. Thereupon, the rail ends are vertically aligned, if necessary taking into account a camber, with the aid of the lifting jacks 41 which are supported on the ballast bed 3. The directional control preferably is effected by applying a measuring ruler to the inner rail edges and to the tread of the rails.

In the aluminothermic rail welding process, the prefabricated casting mold 5 which is made, for example, according to the CO₂ solidification process and inserted into form-retaining plates, is applied or attached, after alignment of the rail ends, to the rail joint centrally with respect to the welding gap 4 and pressed onto the rail ends with the aid of the clamping device 6 secured to the rail 1. After sealing off the seams between the rail and the mold with plastic fireproof materal, the reaction crucible 9 with the crucible holder 7 is moved from the position thereof shown in phantom in FIGURE 1 into the working position thereof by mounting the tubular portion 8 of the crucible holder 7 on a connecting element of the clamping device 6. Thereupon, the crucible outlet is closed in known manner and the crucible 9 is filled with the required aluminothermic mass.

In aluminothermic rail welding including an extraneous preheating of the rail ends to be welded, which is performed before the aluminothermically produced steel is poured into the casting mold, the preheating of the rail ends is generally effected by means of flames passed into the casting mold from above using a wide burner which is mounted above the casting mold and operated, preferably, on a propane/oxygen mixture.

During the preheating operation, the cutting tool 54 is placed upon the rail head and the working cylinder 46 is mounted in the position of rest thereof on the central portion of the traverse 48. Then, the working cylinder 46, together with the clamping jaws 50, is laterally moved on the rollers 47 until it is positioned above the rails to be welded and is then clamped to the rails with the aid of the clamping jaws 50, being pivoted downwardly and enclosing the rail head within the recesses therein. The jaws 50 are clamped by tightening the bolted connection 51, at which time the working cylinder 46 will be in the position shown in FIGURE 1, i.e., inclined with respect to the rail. The bracket 53 mounted at the end of the piston rod 52 then is placed around the projection 55 of the cutting tool 54, which latter is positioned on the rail 1, and the pressure in the pressure reservoir 61 is checked. If the pressure is below the working pressure required for removing the excess weld metal, for example as a result of the clamping of the undercarriage with the rail, the reservoir is recharged and the shearing device is then ready for operation.

Once the rail ends have been sufficiently preheated, the preheating burner is removed and the reaction in the crucible is initiated in known manner. After the reaction, tapping of the crucible into the casting mold is effected, at which time the aluminothermically produced steel running into the gap 4 and into the casting mold cavities will melt down the rail ends and weld them to each other. Then, the crucible holder 7, with the crucible 9, is moved to the supporting element 24, the clamping device 6 is removed from the rail and the form-retaining plates are removed from the casting mold.

If the rail ends to be welded are not preheated, in the aluminothermic rail welding process, by means of preheating burners prior to the casting operation but, instead, the required heat for melting down the welding cross sections is supplied exclusively by the aluminothermically produced steel which is poured into the casting mold, the shearing device is brought into the working position thereof only ofter the casting has been performed whereby losses due to the waiting period between the casting and solidification of the steel poured into the casting mold are effectively prevented.

After the solidification of the weld metal in the mold, the removal of the excess weld metal projecting upwardly and laterally beyond the rail profile is performed with the aid of the shearing device clamped to the rail. For this purpose, the control valve 57 is actuated with the result that the working cylinder 46 is charged with pressure oil from the pressure reservoir 61, as a result of which the piston rod 52 acting behind the projection 55 will force the cutting tool 54, during a single expansion of the reesrvoir 61, through the upper portion of the casting mold within about 2 seconds, thereby cutting off the excess weld metal to the sides and above the rail head true to profile. Then, the pressure oil is passed to the underside of the piston by actuating the control valve 57 while relieving the upper side of the piston so that the piston rod 52 and, therewith, the cutting tool 54 connected to the bracket 53 is returned to the starting position. Then, after release of the bolted connection 51 and upward pivoting of the clamping jaws 50, whereby the working cylinder will assume a horizontal position on the traverse 48, the working cylinder 46 is moved into the corresponding working position for the welding of an oppositely positioned rail joint.

After completion of the weldings, the working cylinder 46 is moved toward the center of the traverse into the rest position thereof and secured against falling down. The lifting elements 41 and the cutting tool 54 are removed and the working cylinders 27 are relieved, whereupon the clamping connection of the frame with the rails is eliminated. In order to make the movement of the undercarriage or frame within the track possible without hindrance, for example by the ballast bed, the undercarriage is brought into a raised position with respect to the track and the rollers, if required, by an operation in which the rollers 21 mounted in the angle levers 20 are pivoted about the axles 19 of the roller carriers 18, after lifting of the undercarriage, until the notches 22 of the angle levers 20 will be supported against the rear edges of the abutments 23. The apparatus then can be moved to the next joints to be welded and is again employed in the manner described above.

The finishing treatment of a welded joint is performed after complete cooling and cleaning of the welded area, in known manner, by grinding with the aid of grinding machines which are moved on the rail and are independent of the apparatus of the present invention.

It will be obvious to those skilled in the art that many modifications may be made within the scope of the present invention without departing from the spirit thereof, and the invention includes all such modifications.

What is claimed is:

1. An apparatus for making rail welds comprising a frame, means on the frame for clamping the frame to rails to be welded, means on the frame for aligning the rails to be welded, means on the frame for supporting a reaction crucible, and means on the frame for removing excess weld metal from a welded joint.

2. An apparatus according to claim 1 including fluid pressure means for actuating the means for clamping the frame to the rails.

3. An apparatus according to claim 1 in which the means for aligning the rails includes a plurality of aligning arms having means thereon for gripping the rails.

4. An apparatus according to claim 1 including fluid pressure means for actuating the means for removing excess weld metal from a welded joint.

5. An apparatus according to claim 1 in which the means for removing excess weld metal from a welded joint includes a cutting tool having a channel shape.

6. An apparatus according to claim 1 including means in the frame forming a reservoir for a fluid pressure medium.

7. An apparatus according to claim 1 including means for generating a fluid pressure.

References Cited

UNITED STATES PATENTS 2,569,083  9/1951  Wilhelm _____ 29—33

RICHARD H. EANES, JR., *Primary Examiner.*